Figure 1:
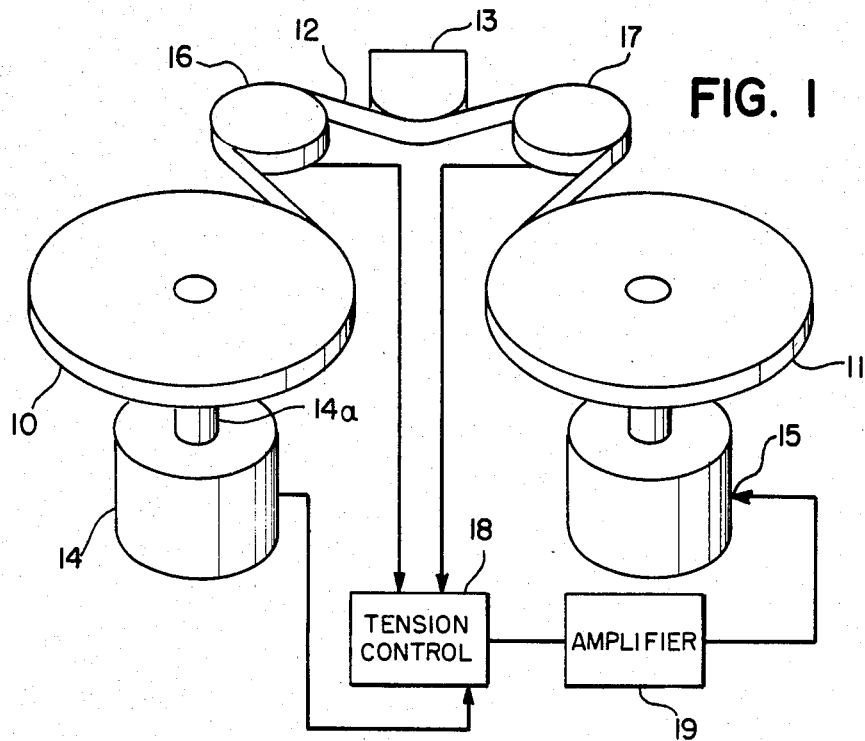

United States Patent [19]

Messenger

[11] Patent Number: 4,523,133
[45] Date of Patent: Jun. 11, 1985

[54] TAPE TRANSPORT SYSTEM WITH TENSION SENSING BEARINGS

[75] Inventor: Carl Messenger, Philadelphia, Pa.

[73] Assignee: Computer Peripherals Inc., Minneapolis, Minn.

[21] Appl. No.: 339,140

[22] Filed: Jan. 13, 1982

[51] Int. Cl.³ .................. B65H 59/38; G11B 15/43
[52] U.S. Cl. ............................ 318/7; 242/186; 360/71
[58] Field of Search .............. 360/71, 72.3, 74.3, 360/90, 93, 102, 104; 242/187–190, 75.5, 75.51, 186, 191; 318/6, 7

[56] References Cited

U.S. PATENT DOCUMENTS

| | | |
|---|---|---|
| 2,168,777 | 8/1939 | McCreary .................. 318/7 |
| 2,943,809 | 7/1960 | Garrett ................... 242/75.61 |
| 3,283,228 | 11/1966 | Asseo ..................... 318/7 |
| 3,416,148 | 12/1968 | Berghaus ................. 360/102 |
| 3,809,335 | 5/1974 | Mantey .................... 242/186 |
| 3,842,326 | 10/1974 | Stocker ................... 318/7 |
| 3,863,117 | 1/1975 | Paschetto ................. 318/7 |
| 3,910,527 | 10/1975 | Buhler et al. ............ 242/186 |
| 3,913,866 | 10/1975 | Hankins ................... 242/191 |
| 4,015,799 | 4/1977 | Koski et al. ............. 242/203 |
| 4,089,488 | 5/1978 | Isikawa ................... 242/192 |
| 4,172,231 | 10/1979 | d'Alayer de Costemore d'Arc et al. ............................ 318/7 |
| 4,213,160 | 7/1980 | Shum et al. ............... 360/90 X |
| 4,242,708 | 12/1980 | Dreiling .................. 360/71 |
| 4,301,687 | 11/1981 | Jewitt et al. ............ 73/862.5 |
| 4,309,728 | 1/1982 | Takizawa et al. .......... 360/71 |
| 4,361,029 | 11/1982 | Platter ................... 73/37.7 |
| 4,363,041 | 12/1982 | Lelandais ................. 360/71 |

OTHER PUBLICATIONS

IBM TDB, vol. 12, No. 11, Apr. 1970, "Electrical Differential Tape Drive System", by Weidenhammer, p. 1805.
IBM TDB, vol. 15, No. 11, Apr. 1973, "Variable-Gain Servo Network", by Buhler et al., pp. 3485–3487.
IBM TDB, vol. 16, No. 7, Dec. 1973, "Web Tension Sensor", by Ellis et al., pp. 2267–2268.

Primary Examiner—Bernard Konick
Assistant Examiner—Steven R. Garland
Attorney, Agent, or Firm—Weiser & Stapler

[57] ABSTRACT

A tape transport system has reduced unreeled tape length by employing only one tape-deflecting bearing on each side of the read/write head. These bearings are fixed in position, but capable of pneumatically sensing tape tension. This tape tension is sensed at both bearings, and used to counteract the effects of stiction at the head.

16 Claims, 3 Drawing Figures

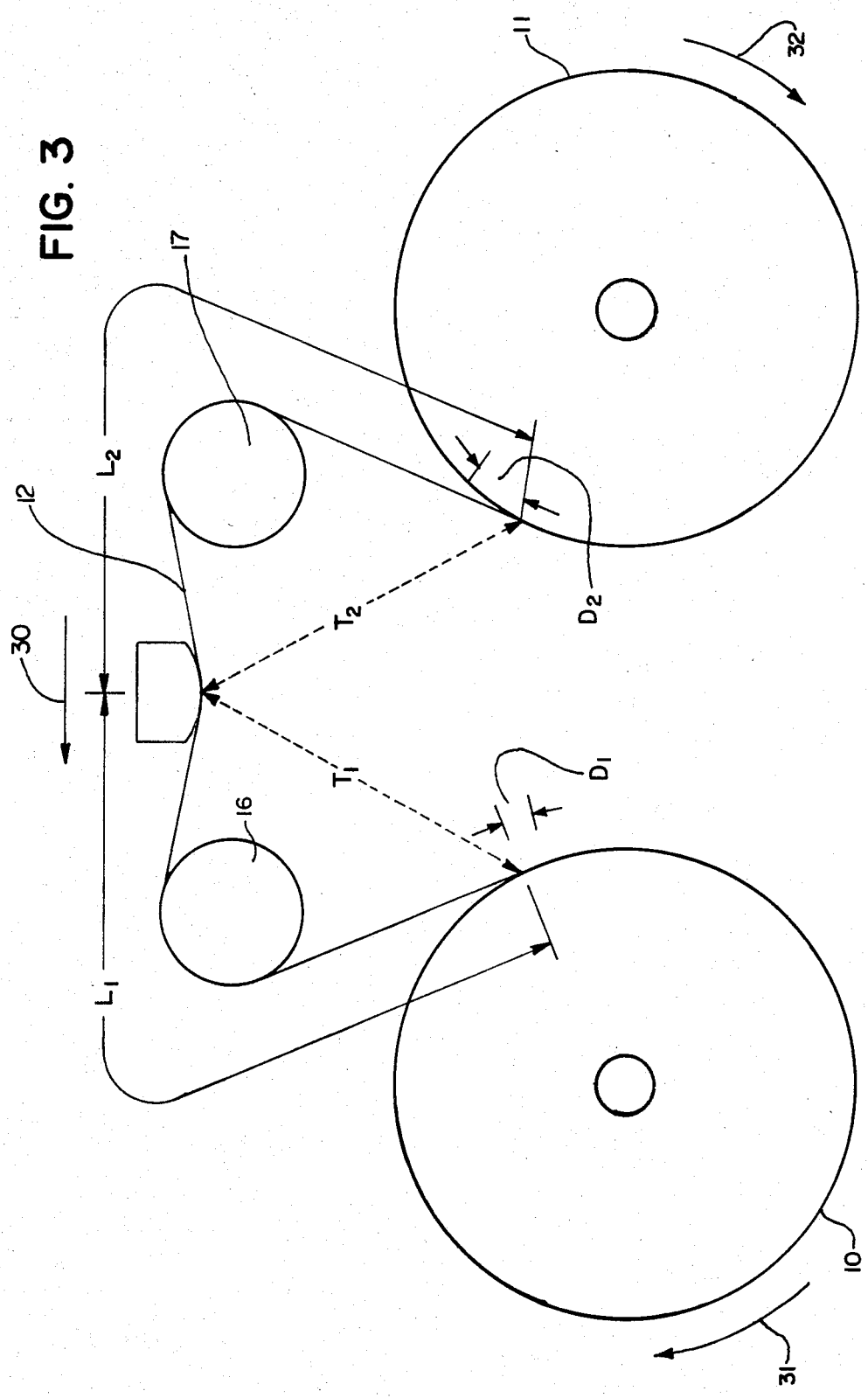

TAPE TRANSPORT SYSTEM WITH TENSION SENSING BEARINGS

This invention relates to improved tape transport systems for magnetic computer tape. More particularly, it relates to such systems in which speed and accuracy of tape transport past the magnetic head is materially improved.

It has been the general practice in such tape transport systems to position a bearing means, in the form of a roller, or a guide, on either side of the magnetic head, so that a slight deflection of the tape in one direction occurs at each of these bearing means as the tape extends beyond it in the direction of the head. This, in effect, then creates a certain amount of "wrap" about the head, which is intended to insure that the tape remains close to the head, as required for good magnetic coupling. Between each of these bearing means, and the respective adjoining tape reel, it has further been the general practice to position an additional bearing means, which imparted to the tape a deflection in the reverse direction. This latter deflection was usually much sharper than the first-mentioned one, typically about 90° or more. This served to provide the major control of tape tension in the system and also to sense the tension, by displacement against a spring force of one of these two additional bearing means in accordance with tape tension variations.

This arrangement had certain undesirable characteristics.

In order to prevent tape distortion due to unintentional axial movements of the deflection-creating bearing means and/or of the reels, all these elements have to be spaced a considerable distance from each other. Thus, it has been considered impractical to have a spacing of less than about four inches between any one reel and its nearest deflection-producing bearing, as well as between one such bearing and the next. Therefore, the total run of tape, from the point at which it leaves one reel to the point at which it rejoins the other, was typically well over one foot in length, and sometimes approached two feet in length in the prior art arrangements discussed above. Unreeled tape is potentially subject to the formation of slack, to dimensional stretching, to the setting up of transverse vibrations, etc. Phenomena such as these are all highly deleterious to the degree of precision of operation which is necessary in modern tape transport systems, given the high density with which data are packed on the tape, and the high speeds of operation which are required.

In addition, there is a potential problem of the tape sticking to the head, especially in conditions of high heat and humidity. This problem, which is sometimes called "stiction", in turn creates various other problems. These other problems also turn out to be associated with the prior art transport arrangements described above, although in a manner which had previously not been adequately recognized.

In particular, when stiction is encountered, the tape must be broken loose from the head before normal tape transport can resume. This requires an increase in the torque exerted by the downstream reel above the torque used during non-stiction conditions, leading to a corresponding increase in the tension in the portion of the tape downstream from the head.

In the prior art transport arrangements described above, the breaking loose of the tape from the head then had to be followed by an equalization of the tension in the portions of the tape upstream and downstream from the head. In addition, these tensions had to return to their normal values, and the reel torques therefore had to be controlled appropriately.

In the prior art transport arrangements described, these readjustments could, and frequently did, create such transients in the overall operation of the arrangement that accuracy of data handling was significantly compromised. In particular, the torque on the reel on the upstream side of the head had to "catch up" with that on the downstream side, at the same time that the torque on the latter had to be readjusted to the value desired during non-stiction operation. Large and long-lasting oscillations in these parameters occurred, leading to corresponding non-uniformities in tape movement past the head. These non-uniformities were sometimes so pronounced that the tape actually became temporarily detached from the head.

Although this was not previously appreciated, it can be shown that these phenomena are closely associated with the use, in the prior art transport arrangements, of only a single tension sensor, and were further aggravated by the use of deflection-creating bearing means which are themselves displaceable (for tension sensing purposes) in the plane of rotation of the tape reels, and by the presence of relatively great lengths of unreeled tape.

Accordingly, it is an object of the present invention to provide a tape transport system which has improved characteristics in one or more of the respects previously discussed.

It is another object to provide such a tape transport system, which has reduced potential for tape slack formation, tape stretching, and transverse vibration.

It is another object to provide such a tape transport system which is capable of reducing the detrimental effects of stiction.

These and other objects which will appear are achieved in accordance with the present invention by providing a configuration of bearing means for the tape which substantially reduces its unreeled length. The total number of such bearing means is simultaneously reduced. Preferably, a single bearing means is interposed between each tape reel and the magnetic head. This single bearing means provides both the sharp tape deflection adjacent the reel and the slight deflection creating the wrap about the head, for which two separate, spaced-apart, bearings had previously been used. These single bearing means used in accordance with the invention are non-displaceable in the plane of reel rotation, thereby reliably preserving the desired amount of tape wrap about the head. Each of these bearing means is so constructed as to also sense tape tension. The signals representing the tension sensed by both of these bearing means are utilized to control one of the two reels forming part of the transport system. Specifically, the two tension-representative signals are additively combined and compared with a reference signal which corresponds to their desired combined values. Variations in the resulting comparison signal are utilized to control the torque exerted at one of the reels, namely at the tension reel of the system.

Preferably, the structural configuration of the system is such that the lengths of unreeled tape between the head and each reel are substantially equal, and the parameters of the control system for the tension reel are so chosen that a small peripheral displacement of the tape on the velocity reel—such as occurs when it is first attempted to overcome stiction by breaking the tape loose from the head—produces a substantially equal peripheral displacement at the tension reel.

The tension-sensing bearing means are preferably air bearings.

Figure 2:
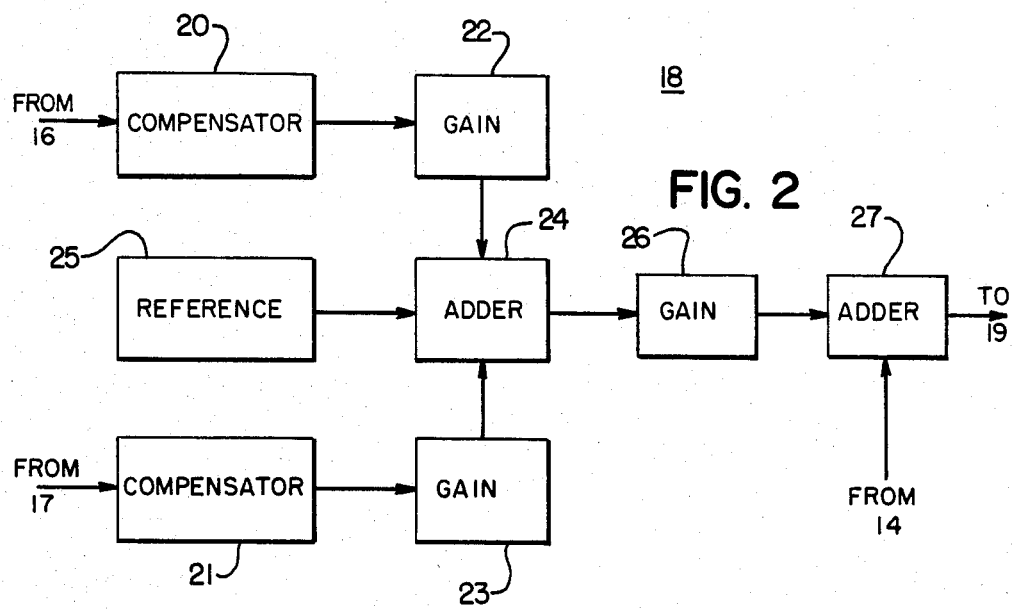

For further details, reference is made to the discussion which follows, in light of the accompanying drawings, wherein FIG. 1 is a somewhat diagrammatic over-all view of the system, FIG. 2 is a block diagram of certain electronic portions of the system of FIG. 1, and FIG. 3 is a simplified diagrammatic representation of the tape path in the system of FIG. 1, which will be useful in explaining some of the parametric relationships in that system.

The same reference numerals are uaed in the figures to designate corresponding elements.

Referring to FIG. 1, this shows two tape reels 10 and 11, between which the magnetic tape 12 is transported. This transport takes place past magnetic read/write head 13, and is accomplished under the drive of two servo motors 14 and 15. Between reel 10 and head 13, there is a single deflection-producing bearing 16. Likewise between reel 11 and head 13, there is a single deflection-producing bearing 17.

These two bearings 16 and 17 are preferably spaced equidistantly from head 13. Their positions are so chosen that they cause the desired amount of tape wrap to occur about head 13, while at the same time being no farther away from this head than is necessary to avoid tape distortions due to unavoidable movements of the system components in directions parallel to the reel axes.

Likewise, the bearings 16 and 17 are spaced from the reels 10 and 11 only by the shortest distance necessary to avoid the same type of tape distortion problem. Also, the system is configured so that the tape joins the reels at the confronting portions of their respective peripheries.

It will be recognized that all this contributes to keeping the unreeled length of tape in the system to a minimum, with all the beneficial effects which this entails. In a practical case, the total length of the unreeled tape can be as short as about one foot, while retaining and even improving over-all system performance.

In accordance with common practice, one of the two servo motors, servo motor 15, is utilized primarily to control tape tension, while the other servor motor 14 is utilized primarily to control tape velocity. Such servo motors are well known, and are conventionally used in tape transport systems. They are therefore not further described here.

The velocity servo motor 14 is preferably controlled on the basis of the rate of rotation of its shaft 14a, as sensed by a suitable optical shaft encoder (not shown).

Control of the tension servo motor 15, on the other hand, is preferably accomplished as follows.

Both bearings 16 and 17 are constructed so as to constitute not only air bearings for the tape, but more specifically air bearings which are also capable of sensing the tension in the tape supported thereby. Such bearings are disclosed, for example, in U.S. Pat. No. 4,301,687 issued Nov. 24, 1981, and assigned to the same assignee as the present invention.

The electrical signals representing the tension so sensed are supplied to tension control circuit 18. From there, control signals are supplied to tension servo motor 15 via amplifier 19:

FIG. 2, to which reference may now be had, shows control circuit 18 in more detail. The respective tension-representative signals from bearings 16 and 17 are supplied via compensators (lead-lag filters) 20 and 21, and gain producing circuits 22 and 23, to an adding circuit 24. Also supplied to adder 24 is a reference signal from source 25. This reference signal represents a reference value of tape tension, as more fully discussed hereafter. The output signal from adder 24 is supplied to another gain producing circuit 26. Its output is in turn supplied to another adding circuit 27, where it is combined with a signal from the velocity servo motor 14 which corresponds to the drive signal applied at any given time to that motor 14. The combined output of adder 27 controls the tension servo motor 15.

As previously noted, in prior tape transport arrangements, it is known to utilize a single tape tension sensor, corresponding in general to tension sensor 17 of FIG. 1, and to process its output signal through a control system which feeds its output back to the motor controlling tension reel 11, and which includes, in essence, those portions of the circuitry which are shown in FIG. 2 associated with the signal from the tension sensor 17. This gives rise to potentially serious problems, particularly when the tape exhibits "stiction", as previously described.

For further explanation of this problem, and of its solution in accordance with the present invention, reference is made to FIG. 3. This shows, in somewhat simplified one-line form, the same tape path as shown in FIG. 1.

Let it be assumed that stiction prevails between head 13 and tape 12. Let it also be assumed that it is desired to start tape 12 moving in the direction of arrow 30, i.e. so as to to unwind from tension reel 11 and to wind up on velocity reel 10. For this purpose, a motor drive signal is applied in conventional manner to motor 14 (FIG. 1), causing reel 10 to start turning in the direction of arrow 31 and thereby to increase the tension $T_1$ in the portion of tape 12 between head 13 and reel 10.

It this occurred in a prior art transport arrangement, the tension reel 11 would initially remain completely unaffected by these happenings at the velocity reel 10, because the stiction at head 13 prevents the change in the tension from $T_1$ being transmitted to the tape portion between head 13 and reel 11, thereby also preventing this change from being sensed by tension sensor 17.

Still dealing with the prior art type of transport arrangement the tension at reel 10 would keep building up more and more—accompanied by a small displacement $D_1$ of the tape 12 in the direction of arrow 31, due to the inherent elasticity of the tape (more will be said about this displacement later)—until the tape breaks loose from head 13. At that moment, the increased tension which had been prevailing in the tape portion ending at velocity reel 10 would be distributed across the entire unreeled tape between reels 10 and 11, and this distributed value would therefore be sensed by tension sensor 17. This, in turn, would actuate the tension reel drive motor 15 to also cause the torque exerted by reel 11 to start changing so as to compensate for the increase, and to start reducing the tape tension between reels (as sensed by sensor 17) toward the value desired during normal tape movement.

It can be shown that such tension compensation (in prior art transport arrangements) is accompanied by oscillatory fluctuations in tape tension compensating due to the operation of the compensating mechanism under these conditions, which are reflected in non-uniformities in tape movement past head 13. Moreover, there also occur oscillatory fluctuations in tape length between reels, before the displacement $D_1$ is reabsorbed. These length fluctuations further accentuate the non-uniformities of tape movement. Finally, these harmful effects become more and more pronounced as the length $L_1$ of the unreeled tape path increases, because the greater this length $L_1$, the greater the stretching of the tape, i.e. the greater the displacement $D_1$, which is required to produce a given stiction-breaking increase in the tension $T_1$.

Thus, the shortening of the unreeled tape path, which is accomplished by the present invention, in itself, diminishes the problems under discussion, as compared with the prior art arrangements having longer unreeled tape paths.

Considerations similar to the foregoing also apply if the tape is to run in the direction opposite to arrow 30 (FIG. 3).

Turning now to how all this is changed by the present invention, it is again noted that this invention utilizes two tension sensors, as integral constituents of bearings 16 and 17, respectively.

Assuming now again stiction at head 13, and desired tape movement in the direction of arrow 30 (FIG. 3), the drive applied to velocity reel 10 will cause a tension increase between reel 10 and head 13, exactly as described before. However, this increase will now be sensed by sensor 16 and a corresponding signal will be supplied to adder 24 (FIG. 2). There, it will be combined with the signal from tension sensor 17, which has not yet changed, at that initial moment. The sum of these two, same-polarity signals will therefore increase, and the difference between their sum and the opposite-polarity reference signal from source 25 will change. This change is utilized to supply, via gain-producing circuit 26 and adder 27, a signal which drives motor 15 and therefore tension reel 11, so as to reduce the tension $T_2$ which that reel 11 produces in the tape portion $L_2$ between reel 11 and head 13. By approriately adjusting the various parameters, the reduction in the tension $T_2$ which is so produced by reel 11 can be made substantially equal to the increase in the tension $T_1$ which is produced by reel 10, while stiction continues to exist. In other words, the sum of these tensions $T_1$ and $T_2$, and also the "average" tension on the head 13 (which is that sum divided by two), both remain substantially constant.

When the stiction is broken, the redistribution of tension between the two portions of the tape occurs much more quickly than in the prior art case previously described. Moreover, the fluctuations in tape tension previously mentioned as occuring in the prior art are essentially eliminated. This is because the tension $T_2$ in tape portion $L_2$ needs to rise only by the same amount by which the tension $T_1$ in the other portion $L_1$ drops; their sum does not need to change at all. As a result, the tension compensating mechanism does not need to make any further adjustments.

Equivalent benefits accrue with respect to changes in tape length. Assuming that the unreeled tape portion from head 13 to reel 11 has a length $L_2$ which approximately equals the unreeled portion length $L_1$ from head 13 to reel 10, the displacement $D_1$ previously mentioned will be accompanied, through the operation of the control system of FIG. 2 in accordance with the present invention, by an approximately equal displacement $D_2$ at reel 11. As a result the total unreeled length $L_1+L_2$ will remain approximately constant, even during the period when the reel 10 tries to break the stiction at head 13, but has not yet succeeded in doing so.

After stiction has been broken, there is no need for this total unreeled tape length to shrink back to its normal length, and the perturbations in tape movement which this shrinking created (in prior arrangements) are correspondingly reduced.

Again, comparable considerations apply when it is desired to have tape 12 run in a direction opposite to arrow 30.

In that case, reel 10 would be driven in the opposite direction to arrow 31 (FIG. 3). This would reduce the tension sensed by sensor 16. This in turn would cause reel 11 to be torqued in the direction opposite to arrow 32, producing a corresponding increase in tape tension tending to break the stiction. The effects on tape length would also be comparable.

It is important to note that the system of the invention, using two tension sensors and signal processing as described above, not only provides major advantages after stiction has been broken, but also aids in breaking the stiction, in the first place. The reason is as follows. In the prior art arrangements, the breaking of stiction is the result solely of an increase in tension on the downstream side of the head, i.e. in tension $T_1$ in the example of movement in the direction of arrow 30; the upstream side tension $T_2$ does not change. In contrast, in the inventive system, the upstream side tension $T_2$ decreases, while the downstream side tension $T_1$ increases. Thus, the tension differential across the head becomes greater for a given increase in downstream side tension, and the stiction will therefore break under a smaller increase of downstream-side tension that in the prior art.

This further reduces the magnitude of detrimental transient after-effects. In addition, it reduces the strain on the tape which is produced while stiction is being broken.

As an illustration of a typical practical case, the following parameters can be cited. The desired average tension across head 13 is 8 ounces. This means that each of tension sensors 16 and 17 measures an 8 ounce force. The reference source 25 then is so constructed as to deliver to adder 24 a signal on one polarity (e.g. plus) whose absolute magnitude is twice the signal delivered with opposite polarity (i.e. minus) from either one of gain producing circuits 22 and 23.

In other words, reference circuit 25 provides a 16 ounce-representative signal.

When stiction occurs, and the velocity reel 10, for example, is driven to break the stiction, the magnitude of the signal supplied from tension sensor 16 to adder 24 increases with increasing tension (becomes more negative). At the same time, the signal from tension sensor 17 does not change immediately. A difference signal therefore is developed by adder 24, and this drives tension reel 11 to reduce the tension on sensor 17 by substantially the same amount by which that on sensor 16 has increased, thereby also restoring the sum of the tension sensor signals to substantial equality with the reference signal. When stiction is broken, the increased tension at sensor 16 will be relieved and return to 8 ounces, while that at sensor 17 will rise, again to 8 ounces. No substantial difference signal is developed by adder 24 and the reels move essentially in unison.

It is further noted that the system of the present invention is advantageous not only for instances of stiction, but also during running of the tape without stiction, but in the presence of friction at the head.

Suppose that the tape is being wound up on reel 10, and that friction at the head requires a 1-ounce increase in the downstream tension $T_1$ to overcome this friction. The system of FIG. 2 would then operate to reduce the upstream tension by substantially the same amount, leaving the average tension on head 13 the same as if there were no friction at all.

It is also noted that the most effective configuration of the system is that in which the lengths $L_1$ and $L_2$ are substantially the same. It is under these conditions that it becomes possible, to obtain the desired control signal for tension reel 11, using balanced signal processing in both branches of the circuitry leading to adder 24 (FIG. 2).

If the lengths of tape $L_1$ and $L_2$ are not substantially equal, then the advantages of the present invention will still be realized in basic principle, but not to the same optimum degree. The reason for this as follows.

Assume for illustration that $L_1$ is substantially shorter than $L_2$, and that it is desired to break stiction at head 13 and to wind tape 12 up on velocity reel 10. The increase in the downstream tension $T_1$ sensed as a result by sensor 16 will produce, through the electronics of FIG. 2, a corresponding reduction in the upstream tension $T_2$. However, to achieve such a reduction, the distance $D_2$ (FIG. 3) through which the upstream tape portion must move is greater than the distance $D_1$ through which the downstream tape portion will have moved. Therefore the total unreeled length of tape will have changed (increased) and thus must be compensated for after stiction is relieved. Thus, there exists, under these illustrative circumstances, a condition which is intermediate between that which would prevail in the absence of the present invention, and that which would prevail if the optimum condition existed in which $L_1$ substantially equals $L_2$. In the former case (absence of the present invention) there would be no compensating movement or tension reduction at all in the upstream tape portion until stiction breaks, with all the accompanying ill effects which have previously been noted. In the latter case ($L_1$ equal to $L_2$) there would be substantially full compensating tape movement and tension reduction. In the intermediate condition (unequal $L_1$ and $L_2$), a correspondingly intermediate degree of compensation is achieved.

Special attention is also invited to the favorable systems interaction between the structural features of the system embodying the invention and its electronic control features.

The structural arrangement (See FIG. 1) is such as to produce a short unreeled tape path. This is advantageous from the control standpoint, because it minimizes the displacements $D_1$ and $D_2$ which are involved in respectively increasing the stiction-breaking downstream tension and decreasing the compensating upstream tension.

The use of tension-sensing bearings 16 and 17 which are not intentionally displaceable in the plane of rotation of the reels 10 and 11 prevents the lengths $L_1$ of $L_2$ from changing as the tensions vary during system operation. This makes it possible to maintain the optimum $L_1$ equal to $L_2$.

Preferably both tension sensors 16 and 17 saturate at a magnitude less than the reference values. This prevents formation of tape slack due to the upstream reel attempting to reduce the tension below zero.

It will be understood that the specific embodiments disclosed are not intended to limit the scope of the invention, which is defined by the appended claims.

I claim:

1. A system for transporting magnetic tape between reels and past a magnetic read/write head, comprising
   a pair of tape-deflecting bearings, respectively supporting the tape on opposite sides of said head,
   said bearings being geometrically positioned relative to the head so as to produce a predetermined amount of tape wrap about the head, with one direction of curvature around said bearings and the opposite direction of curvature around said head,
   said pair of bearings being the only tape-deflecting bearings between the reels and the head, and said bearings being constructed and arranged so as not to be subject to intentional displacement in the plane of rotation of the tape reels,
   each of said bearings having means for sensing the tension in the tape portion supported thereby,
   servo motors for driving said reels, and
   means for utilizing the tension sensed by both said sensing means to control the motor driving one of said reels.

2. The system of claim 1 wherein one of said servo motors is a tension servo motor, and wherein said pair of tension sensing means cooperate to control said tension servo motor.

3. The system of claim 2 wherein the other of said servo motors is a velocity servo motor, and wherein said velocity servo motor operates responsive to a tachometer signal.

4. The system of claim 3 wherein said tachometer signal also cooperates with the signals produced by said tension sensing means to control said tension servo motor.

5. The system of claim 1 wherein the magnetic tape joins the reels at confronting portions of respective peripheries of said reels.

6. A system for transporting magnetic tape between reels and past a magnetic read/write head, comprising
   a pair of tape-deflecting air bearings, respectively supporting the tape on opposite sides of said head,
   said air bearings being geometrically positioned relative to the head so as to produce a predetermined amount of tape wrap about the head, with one direction of curvature around said air bearings and the opposite direction of curvature around said head,
   said pair of air bearings being the only tape-deflecting bearings between the reels and the head, and said air bearings being constructed and arranged so as not to be subject to intentional displacement in the plane of rotation of the tape reels,
   each of said air bearings having pneumatic means forming part of the air bearing for sensing the tension in the tape portion supported thereby,
   servo motors for driving said reels, and
   means for utilizing the tension sensed by both said sensing means to control the motor driving one of said reels.

7. The system of claim 6 wherein a side of the tape is provided with an oxide layer, and wherein the air bearings are positioned relative to the reels and the head so that the oxide side of the tape faces away from the bearings.

8. A system for transporting magnetic tape between reels and past a magnetic read/write head, comprising
- a pair of tape-deflecting air bearings, respectively supporting the tape on opposite sides of said head,
- said bearings being geometrically positioned relative to the head so as to produce a predetermined amount of tape wrap about the head, with one direction of curvature around said bearings, and the opposite direction of curvature around said head,
- said pair of bearings being the only tape-deflecting bearings between the reels and the head, and said bearings being constructed and arranged so as not to be subject to intentional displacement in the plane of rotation of the tape reels,
- each of said air bearings having means for sensing the tension in the tape portion supported thereby,
- servo motors for driving said reels, and
- means for utilizing the tension sensed by both said sensing means to control the motor driving one of said reels,
- said utilizing means including
- means for producing signals respectively representing the tension sensed by the respective sensing means,
- means for producing a reference signal,
- means for comparing said reference signal subtractively with the sum of said tension representing signals, and
- means for utilizing the comparison to control said motor.

9. The system of claim 8 wherein the signal produced by each tension sensing means saturates at a magnitude which is less than that of the reference signal.

10. A system for transporting magnetic tape between reels and past a magnetic read/write head, comprising
- a pair of tape-deflecting air bearings, respectively supporting the tape on opposite sides of said head,
- said bearings being geometrically positioned relative to the head so as to produce a predetermined amount of tape wrap about the head, with one direction of curvature around said bearings, and the opposite direction of curvature around said head,
- said pair of bearings being the only tape-deflecing bearings between the reels and the head, and said bearings being constructed and arranged so as not to be subject to intentional displacement in the plane of rotation of the tape reels,
- each of said air bearings having means for sensing the tension in the tape portion supported thereby,
- servo motors for driving said reels, and
- means for utilizing the tension sensed by both said sensing means to control the motor driving one of said reels,
- said utilizing means including
- means for producing signals respectively representing the tension sensed by the respective sensing means,
- means for producing a reference signal with an absolute magnitude substantially equal to the sum of the signals representing the desired tension in the respective tape portions,
- means for comparing said reference signal subtractively with the sum of said tension representing signals, and
- means for utilizing the comparison to control said motor.

11. A system for transporting magnetic tape between reels and past a magnetic read/write head, comprising
- a pair of tape-deflecting air bearings, respectively supporting the tape on opposite sides of said head,
- said bearings being geometrically positioned relative to the head so as to produce a predetermined amount of tape wrap about the head, with one direction of curvature around said bearings, and the opposite direction of curvature around said head,
- said pair of bearings being the only tape-deflecting bearings between the reels and the head, and said bearings being constructed and arranged so as not to be subject to intentional displacement in the plane of rotation of the tape reels,
- each of said air bearings having means for sensing the tension in the tape portion supported thereby,
- servo motors for driving said reels, and
- means for utilizing the tension sensed by both said sensing means to control the motor driving one of said reels,
- said utilizing means including
- means for producing signals respectively representing the tension sensed by the respective sensing means,
- means for producing a reference signal,
- means for comparing said reference signal subtractively with the sum of said tension representing signals, and
- means for utilizing the comparison to control said motor, said comparison utilizing means including means for causing the controlled motor to change the torque applied to the reel driven by that motor so that the tension in the portions of the tape between the driven reel and the head is caused to vary in opposite sense to the variation in tension sensed in the tape portion between the head and the other reel.

12. The system of claim 11 wherein
the said tension which is caused to vary does so by an amount substantially equal to said sensed variation.

13. The system of claim 12 wherein
the unreeled tape portions between each reel and the head are of substantially equal lengths.

14. The system of claim 11 further comprising means for producing a drive signal for the motor driving the other reel of the system, and means for additionally controlling the motor driving said one reel with a signal which represents said drive signal for said other reel.

15. A system for transporting magnetic tape between reels and past a magnetic read/write head, comprising
- a pair of tape-deflecting bearings, respectively supporting the tape on opposite sides of said head,
- said pair of bearings being the only tape-deflecting bearings between the reels and the head, and said bearings being constructed and arranged so as not to be subject to intentional displacement in the plane of rotation of the tape reels,
- said bearings being geometrically positioned relative to the head so as to produce a predetermined amount of tape wrap about the head, with a first direction of curvature around said head, a second direction of curvature opposite the first direction around said bearings, and a third direction of curvature opposite the second direction around said reels, each of said bearings having means for sensing the tension in the tape portion supported thereby,
servo motors for driving said reels, and
means for utilizing the tension sensed by both said sensing means to control the motor driving one of said reels.

16. The system of claim 15 wherein a side of the tape is provided with an oxide layer, and wherein the air bearings are positioned relative to the reels and the head so that the oxide side of the tape faces away from the bearings.

* * * * *